April 14, 1925.
R. J. BURN
1,533,161
AUTOMATIC RESETTING TROLLEY CARRIER FOR ELECTRIC STREET CARS
Filed April 1, 1924 2 Sheets-Sheet 1
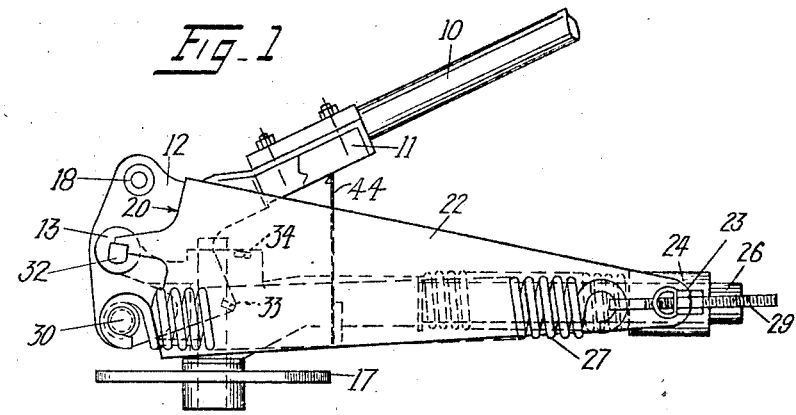
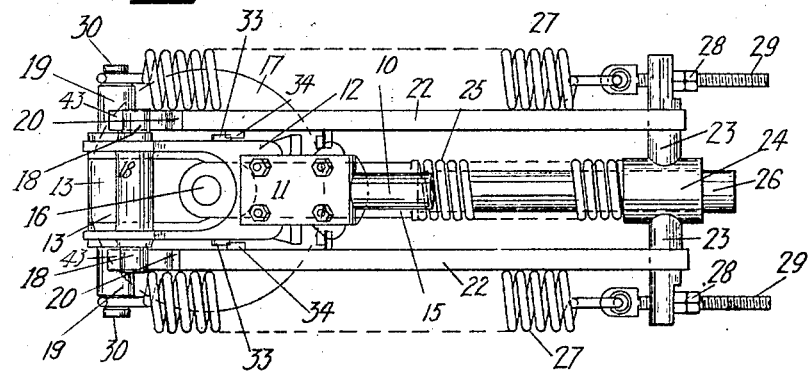

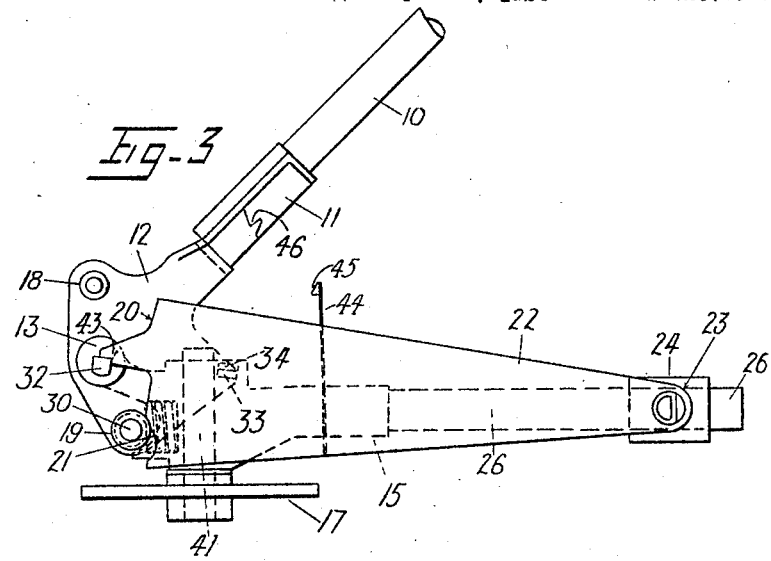
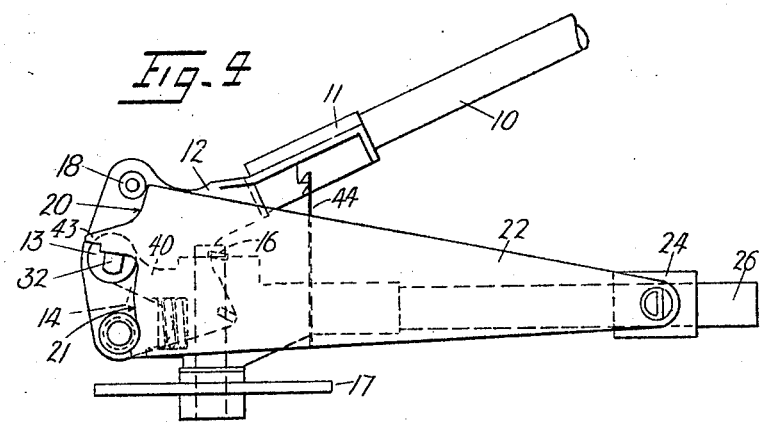
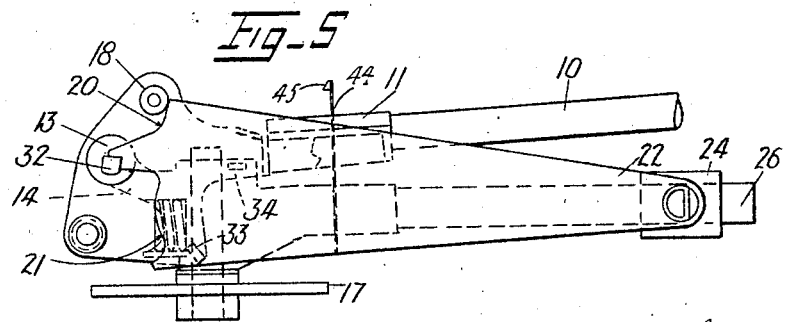

Patented Apr. 14, 1925.

1,533,161

UNITED STATES PATENT OFFICE.

ROBERT JOHN BURN, OF CROYDON, NEAR SYDNEY, NEW SOUTH WALES, AUSTRALIA.

AUTOMATIC RESETTING TROLLEY CARRIER FOR ELECTRIC STREET CARS.

Application filed April 1, 1924. Serial No. 703,357.

*To all whom it may concern:*

Be it known that I, ROBERT JOHN BURN, subject of the King of Great Britain and Ireland, residing at 32 Carshalton Street, Croydon, near Sydney, New South Wales, Australia, have invented new and useful Improvements in Automatic Resetting Trolley Carriers for Electric Street Cars, of which the following is a specification.

This invention relates to trolley mountings for electric street cars. It consists in an improved trolley arm mounting of the type in which the arm is released by its normal supports and is allowed to drop by gravity whenever the trolley head skips the trolley line, in order to obviate damage to the trolley suspension lines by impact of the trolley arms thereon.

According to the present invention, the trolley arm shoulder is mounted on a horizontally disposed pivot which is carried on a bracket mounted for rotation on a vertical stud which is fixed on the car roof structure, and it is supported by helical springs which pull on the shoulder below its pivot and thereby raise the arm so that the wheeled head of it will contact with the trolley line. The tails of these springs are carried by a slider on a rearward extension member of the shoulder supporting bracket, and they are tensioned by moving said slider along said extension member. The slider is held in the tensioned position by a pair of strut members the forward ends of which are engageable with chock lugs which function as abutments for the strut members on the shoulder supporting bracket. Said bracket is armed with strikers above and below the trolley arm pivot. When the arm jumps upwards, which happens when the head skips the trolley line, the lower strikers kick the struts up and so free them from the abutment lugs; the tension on the support springs being thus relieved sufficiently, the trolley arm is no longer supported by them at its normal working angle, and immediately drops by gravity. A buffer spring is fitted to take up the rebound of the slider when the struts are thus released from their abutments. In the falling movement of the trolley arm the upper strikers contact with the cam faces on the ends of the struts and force the struts backward, thus partially retensioning the arm support springs and so buffering the arm descent. These strikers force the struts full back and downward to reengage them with the abutment lugs when the trolley arm is pulled down to the full extent by means of a leash cord, which done, the trolley arm is again raised by the retensioned springs and is guided by the leash cord manually to find the trolley line with the wheeled head in the usual way. A striker is supplementarily provided to ensure the release of the struts from their abutments during the upward movement of the trolley arm when the head skips the overhead line.

In the accompanying drawings—

Fig. 1 is a side elevational view of a trolley arm carrier according to the present invention, showing the trolley arm as it appears when at the normal running angle, when the trolley head is contacting with the overhead trolley line;

Fig. 2 is a corresponding top plan, the upper part of the arm being broken away;

Fig. 3 is an elevational view showing the position of the parts when the trolley head has skipped the line and the arm has lifted above its normal top limit position;

Fig. 4 is a similar view showing the position automatically assumed by the parts immediately after the trolley head has skipped the line and has fallen to a low angle; and Fig. 5 is a similar view showing the position of the parts whilst the arm is being reset by pulling it full down by means of the leash cord before allowing it to rise again to engage the trolley head on the trolley line.

The upper part of the trolley arm 10 carries a grooved wheel head adapted to run on the overhead trolley line in the usual way. The bottom end of the arm 10 is fixed in a clamp 11 on a shoulder piece 12, and this shoulder piece is mounted on a horizontal pivot 13. The arm 10, therefore, has freedom for movement in a vertical plane. The pivot 13 is mounted in a forward bracket extension 40 of the carrier 15. 26 is a rearward extension member of the carrier 15. The carrier 15 is mounted for free rotation on a vertical stud 41 which is supported on a flanged plate 17 adapted to be fixed on the car roof structure. The movement of the carrier and the parts supported by it about the stud 41 offers liberty for lateral movement of the arm 10 in following the overhead line where that line diverges laterally from above the centre of the track, as on curves.

The arm shoulder 12 is armed on the sides of it with two pairs of strikers, an upper pair 18 and a lower pair 19; these strikers are respectively engageable with the upper and lower cam shaped portions of the end faces of a pair of strut members 22. The rear ends of these strut members are pivotally mounted on cross tree arms 23 carried by a slider 24, which is freely movable along the carrier extension member 26. 25 is a buffer spring which takes the inward thrust of the slider 24 when the cross tree arms 23 move forwardly as hereinafter described. The outer ends of the cross tree arms 23 carry screwed tail rods 29 which are fitted with tension adjusting nuts 28. To these tail rods the rear ends of a pair of helical springs 27 are hooked. The forward ends of these springs 27 are hooked on the ends of the lower strikers 19 which are extended laterally to facilitate this attachment and to offer clearance. At their forward ends the strut members 22 are formed with notched toe pieces 43 which are adapted to engage the projecting squared ends of the shoulder pivot 13. The toe pieces 43 are slightly undercut so that when engaged with the squared ends 32 of the pivots 13 they will not be displaced in running by the vibrational disturbance coming from the car. 33 are inset lugs on the sides of the shoulder member 12, and 34 are coacting offset lugs on the sides of the struts 22. Striking contact of the lugs 33 with the lugs 34 in the upward movement of the arm 10 ensures release of the toe pieces 43 from the pivot ends 13. 44 are leaf springs fitted with hook ends 45 adapted for engagement with staples 46 on the sides of the clamp 11. When the tension on the springs 27 is released as hereinafter described, the hooks of the spring 44, which are mounted on the strut members 22, come into engaging relation so that when the arm is held down the hooks 45 engage the staples 46, and the arm 10 is then held down to idle position, as shown in Fig. 4.

The springs 27 are fully tensioned only when the strut members 22 are forced backward so as to push the slider 24 back along the guide extension 26 of the carrier. When pushed sufficiently back the toes 43 on their forward ends engage the squared lug ends 32 of the shoulder pivot 13 and take abutment against them. With the parts thus disposed, the fully tensioned springs 27 acting on the shoulder through the lower strikers 19 cause the arm 10 to swing upward to make contact between its head and the trolley line; this is the normal running position. The necessary tension is adjusted by means of the nuts 28.

If the trolley head skip the overhead line, the tension lift of the springs 27 acting on the arm 10 momentarily throws the arm 10 upward. In this upward movement of the arm the lower strikers 19 moving rearwardly engage the lower cam faces 21 on the forward ends of the struts 22, forcing the struts momentarily backward to clear their toes 43 from the abutment checks 32, and then swinging the struts upward so as to clear their toes 43 from the abutment checks 32. The clearance is ensured by the striking of the lugs 34 against the lugs 33. The struts 22 being then without abutment move forwardly, and tension on the springs 27 is relieved, with the result that the arm 10, being no longer adequately sustained, falls by gravity until the upper striker 18 engages the upper cam faces 20 on the ends of the struts 22 and the spring hooks 45 engage the staples 46; the arm 10 is thus buffered in its fall and is held down to the fallen position and does not oscillate vertically. The contact of the strikers 18 with the cam faces 20 buffers the fall of the arm 10 so that it is brought to rest before it contacts with the car roof.

To restore the arm 10 to the running position it is pulled down manually by the usual leash cord attachment so that it is brought to the position shown in Fig. 5. In this down-pulling movement the strikers 18 are caused to press hard against the cam faces 20, thus to force back the struts 22 until their toes 43 are re-engaged with the abutment checks 32 and the springs 27 fully tensioned. Upon easing away the leash cord the arm 10 will then be raised by the spring action. It is guided manually by means of the cord so that the roller head will meet the overhead line in the usual way. On meeting the overhead line the parts will have resumed their normal running position shown in Fig. 1.

The mechanical arrangement, therefore, is such that upon the momentary upward jump of the trolley arm, which occurs when its head skips the line, the strut abutments are kicked open and the tension on the support springs is relieved with the result that the arm drops to a buffered position whence its restoration of the arm may be effected rapidly by means of the leash cord, a pull down movement operating to restore the struts and consequently to fully retension the support springs so that the arm will then be raised by the springs immediately to re-engage the roller head with the overhead line.

What I claim as my invention and desire to secure by Letters Patent is:—

1. A trolley arm mounting comprising a horizontally rotatable carriage, a shoulder member carrying the arm and mounted on a horizontal pivot in the forward end of said carriage, striker lugs extending laterally from the shoulder member above and below said pivot respectively, a slider movable along the rear end of the carriage, a tension spring connecting said slider with the lower part of the arm shoulder, a strut member connected at one end to said slider and at the other end engageable by a check toe with an abutment situate in axial relation to the shoulder pivot, and cam faces on the fore end of the strut above and below said check toe, said cam faces in operative relation to the striker lugs on the shoulder member.

2. A trolley arm mounting according to claim 1, having a pair of strut members and a pair of tension springs with the slider formed as a cross tree carrying the spring hangers at either end of its arms.

3. A trolley arm mounting according to claim 1, having the strut abutments formed on the ends of the shoulder pivot.

4. A trolley arm mounting according to claim 1, having a spring arm with catch tooth on the strut member and a staple lug on the arm shoulder, said tooth and lug having operative relation only when the strut is free of the abutment on the shoulder.

5. A trolley arm mounting according to claim 1, having a pair of strut members and a pair of tension springs with the slider formed as a cross tree carrying the spring hangers at either end of its arms, and a buffer spring on the slider guide adapted for taking the impact of the slider when the strut abutments are cleared and the tension on the carrier springs thus relieved.

6. A trolley arm mounting wherein the arm springs are tensioned by a member which is set against an abutment, and in which said member is kicked free from the abutment by a striker on the base of the trolley arm when said arm swings above a predetermined angular position.

7. A trolley arm mounting according to claim 6, wherein the arm base is provided with resetting strikers which are engageable with the tension holding members only when the arm is brought to a low angle, and which are adapted to then force the said member to normal position and effect its re-engagement with its abutment and re-tension the arm springs.

8. A trolley arm mounting comprising an arm shoulder member pivotally supported in a horizontally rotatable carriage, a spring tensioned by a strut member, an abutment for said strut member coincident in position with the shoulder pivot, strikers on the shoulder member above and below said pivot respectively, and contact faces on the strut ends respectively engageable by said strikers when the arm is above and when the arm is below the normal range of its movement.

9. In a trolley arm mounting according to claim 1, coacting strikers on the sides of the arm shoulder and the sides of the struts, said strikers arranged to engage when the arm comes above the limit working angle and thereby forcibly lift the struts and ensure their release from their abutments.

In testimony whereof I have signed my name to this specification.

ROBERT JOHN BURN.